US012781047B2

(12) United States Patent
Ren et al.

(10) Patent No.: US 12,781,047 B2
(45) Date of Patent: Nov. 3, 2026

(54) POLYCARBONATE COMPOSITION WITH HIGH COMPARATIVE TRACKING INDEX

(71) Applicant: Covestro Deutschland AG, Leverkusen (DE)

(72) Inventors: Lily Ren, Shanghai (CN); Shun Wan, Shanghai (CN); Arron Gao, Shanghai (CN); Vivian Guo, Shanghai (CN)

(73) Assignee: Covestro Deutschland AG, Leverkusen (DE)

( * ) Notice: Subject to any disclaimer, the term of this patent is extended or adjusted under 35 U.S.C. 154(b) by 492 days.

(21) Appl. No.: 18/288,064

(22) PCT Filed: Apr. 20, 2022

(86) PCT No.: PCT/EP2022/060327
§ 371 (c)(1),
(2) Date: Oct. 24, 2023

(87) PCT Pub. No.: WO2022/228952
PCT Pub. Date: Nov. 3, 2022

(65) Prior Publication Data

US 2024/0218175 A1 Jul. 4, 2024

(30) Foreign Application Priority Data

Apr. 26, 2021 (WO) ................ PCT/CN2021/089939
May 18, 2021 (EP) .................................... 21174270

(51) Int. Cl.
*C08L 69/00* (2006.01)

(52) U.S. Cl.
CPC ......... *C08L 69/00* (2013.01); *C08L 2205/025* (2013.01)

(58) Field of Classification Search
CPC ........................... C08L 2205/025; C08L 69/00
See application file for complete search history.

(56) References Cited

U.S. PATENT DOCUMENTS

2011/0144283 A1 6/2011 Heuer et al.
2017/0044365 A1 2/2017 van de Wetering et al.
2018/0179378 A1* 6/2018 Wehrmann .............. C08L 69/00

FOREIGN PATENT DOCUMENTS

| | | | |
|---|---|---|---|
| CN | 102070886 | A | 5/2011 |
| DE | 1031512 | | 6/1958 |
| EP | 2032651 | B1 | 8/2015 |
| JP | 2011137153 | A | 7/2011 |
| WO | 9955772 | A1 | 11/1999 |

OTHER PUBLICATIONS

Schnell, Chemistry and Physics of Polycarbonates, Polymer Reviews, 1964,p. 33, vol. 9, Interscience Publishers, New York.

* cited by examiner

*Primary Examiner* — Ana L. Woodward
(74) *Attorney, Agent, or Firm* — The Webb Law Firm

(57) ABSTRACT

The present disclosure relates to a polycarbonate composition including, relative to the total weight of the composition, a) 60-95 wt. % of a copolycarbonate, and b) 5-40 wt. % of a homopolycarbonate. The weight-average molecular weight of the homopolycarbonate is in the range of 24000-28000 g/mol, wherein the total amount of the homopolycarbonate and the copolycarbonate in the composition is 96-100 wt. %, relative to the total weight of the composition. The present disclosure also relates to a shaped article made from the composition. The polycarbonate composition according to the present disclosure has a high Comparative tracking index.

16 Claims, No Drawings

POLYCARBONATE COMPOSITION WITH HIGH COMPARATIVE TRACKING INDEX

CROSS-REFERENCE TO RELATED APPLICATIONS

This application is the United States national phase of International Application No. PCT/EP2022/060327 filed Apr. 20, 2022, and claims priority to International Application No. PCT/CN2021/089939 filed Apr. 26, 2021 and European Patent Application No. 21174270.5 filed May 18, 2021, the disclosures of which are hereby incorporated by reference in their entireties.

BACKGROUND

Technical Field

The present invention relates to a polycarbonate (PC) composition. In particular, the present invention related to a polycarbonate composition with high comparative tracking index, and a shaped article made from the same.

Background Art

Polycarbonate is widely used for a variety of applications, such as automotive, electric and electronic fields due to excellent optical, mechanical and heat resistant properties as well as excellent thermal processing ability thereof.

Copolycarbonates, as special types of polycarbonates, are widely used in electrical and electronic sectors, as housing material of lights, and in applications where particular thermal and mechanical properties are required, for example blow dryers, applications in the automotive sector, plastic covers, diffuser screens or waveguide elements and lamp covers or lamp bezels.

It is known the heat distortion resistance of polycarbonate is improved by the introduction of a specific building block based on 1,1-bis(4-hydroxyphenyl)-3,3,5-trimethylcyclohexane (Bisphenol TMC) into the polycarbonate backbone. The copolycarbonate obtained thereby (so-called high-Tg polycarbonate) is expensive. Furthermore, the flowability of such kind of copolycarbonates is not high due to its relatively higher glass transition temperature (Tg).

Recently there is a trend to miniaturize electronic and electrical devices in the field of electric and electronic applications. This prompted the adoption of more complicated and compacted design of electrical devices including plastic housings or parts. Therefore, safety-related properties of plastic materials, such as comparative tracking index (CTI), were required in the field of electronics and electrical applications.

For instance, high CTI rank (e.g., CTI=600V as determined according to IEC60112:2011) is required for plastic materials. However, it has been well known that the comparative tracking index for standard polycarbonate resin is only around 250V or even below. Even though a few types of blends of PC/ABS or PC/PBT could more or less enhance the CTI values of the finished blends. For example, commercialized PC/ABS alloys generally show a CTI in a range of 275V-350V, a bit higher than that of standard bisphenol A polycarbonate (CTI of about 250V).

CN102070886 disclose compositions comprising polycarbonate, polyethylene terephthalate, and flame retardants having a high CTI rank. However the compositions disclosed in CN102070886 lost the optical quality. This greatly limits the potential applications of such materials.

Thus, there is a demand to enhance CTI of polycarbonate compositions, meanwhile maintain the excellent properties of polycarbonate resin, such as good optical quality, high heat resistance and good flowability.

SUMMARY

One object of the present application is thus to provide a polycarbonate composition which has a good combination of comparative tracking index, optical quality, heat resistance and flowability.

Another object of the present application is to provide an article which has a good combination of comparative tracking index, optical quality and heat resistance.

In a first aspect, the present invention provides a polycarbonate composition comprising, relative to the total weight of the composition:

a) 60-95 wt. % of a copolycarbonate comprising i) 42-90 mol % of an unit of formula (1)

(1)

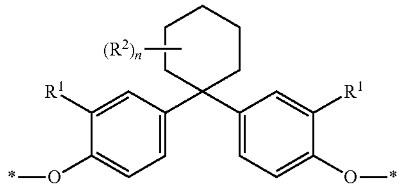

wherein

* indicates the position where formula (1) is connected to the polymer chain, $R^1$, each independently, is hydrogen or $C_1$-$C_4$ alkyl, $R^2$, each independently, is $C_1$-$C_4$ alkyl, n is 0, 1, 2 or 3, and ii) 10-58 mol % of an unit of formula (2):

(2)

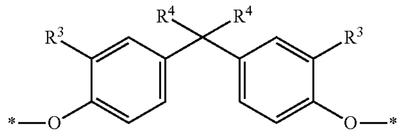

wherein

* indicates the position where formula (2) is connected to the polymer chain, $R^3$, each independently, is H, linear or branched $C_1$-$C_{10}$ alkyl, and $R^4$, each independently, is linear or branched $C_1$-$C_{10}$ alkyl, wherein the mol % is calculated based on the total mole number of units of formula (1) and formula (2), and b) 5-40 wt. % of a homopolycarbonate comprising an unit of formula (2) as defined above, wherein the weight-average molecular weight of the homopolycarbonate is in the range of 24000-28000 g/mol, wherein the content by weight of the unit of formula (1) in the polycarbonate composition is 42-80 wt. %, relative to the total weight of the composition, and the total amount of the homopolycarbonate and the copolycarbonate in the composition is 96-100 wt. %, relative to the total weight of the composition.

As used herein, the content by weight of the unit of formula (1) in the polycarbonate composition ($C_{1/C/W}$) is calculated as follows:

$$C_{1/C/W} = \frac{C_{1/CO/M} \times M_{w1}}{(C_{1/CO/M} \times M_{w1'} + C_{2/CO/M} \times M_{w2})} \times C_{co/c/w}$$

Wherein $C_{1/C/W}$ stands for the content by weight of the unit of formula (1) in the polycarbonate composition;

$C_{1/CO/M}$ stands for the content by mole of the unit of formula (1) in the copolycarbonate;

$M_{w1}$ stands for the molecular weight of the unit of formula (1), which is expressed in grams per mole;

$M_{w1'}$ stands for the total molecular weight of the unit of formula (1) and —C═O—, which is expressed in grams per mole;

$C_{2/CO/M}$ stands for the content by mole of the unit of formula (2) in the copolycarbonate;

$M_{w2}$ stands for the molecular weight of the unit of formula (2), which is expressed in grams per mole; and $C_{co/c/w}$ stands for the content by weight of the copolycarbonate in the polycarbonate composition.

The inventors have discovered unexpectedly that the composition according to the present invention has a comparative tracking index up to 600V as determined according to IEC60112:2011, exhibits a transmittance of above 86% for a visible light with a wavelength of 390-780 nm as determined according to ASTM D1003: (2013) on a sheet prepared therefrom with a thickness of 3 mm, a MVR of above 9 $cm^3$/10 min as determined at 330° C., 1.2 kg according to ISO 1133: 2011 and a Vicat softening temperature of above 175° C. as determined according to ISO 306: (2013)

Comparative tracking index (CTI) means a numerical value of the maximum voltage at which five test specimens withstand a test period for 50 drops without tracking failure and without a persistent flame occurring, as determined according to IEC60112:2011.

In a second aspect, the present invention provides a shaped article made from a polycarbonate composition according to the first aspect of the present invention.

In a third aspect, the present invention provides a process for preparing the shaped article mentioned above, comprising injection moulding, extrusion moulding, blow moulding or thermoforming the polycarbonate composition according to the first aspect of the present invention.

Other subjects and characteristics, aspects and advantages of the present invention will emerge even more clearly on reading the description and the examples that follow.

DESCRIPTION

In that which follows and unless otherwise indicated, the limits of a range of values are included within this range, in particular in the expressions "between . . . and . . . " and "from . . . to . . . ".

Unless defined otherwise, all technical and scientific terms used herein have the same meaning as commonly understood by one of ordinary skill in the art to which the present invention pertains. When the definition of a term in the present description conflicts with the meaning as commonly understood by those skilled in the art the present invention belongs to, the definition described herein shall apply.

Throughout the instant application, the term "comprising" is to be interpreted as encompassing all specifically mentioned features as well optional, additional, unspecified ones. As used herein, the use of the term "comprising" also discloses the embodiment wherein no features other than the specifically mentioned features are present (i.e. "consisting of").

Unless otherwise specified, all numerical values expressing amount of ingredients and the like which are used in the description and claims are to be understood as being modified by the term "about".

Component A

According to the first aspect, the polycarbonate composition according to the present invention comprises a copolycarbonate.

In the present application, the copolycarbonate refers to the polycarbonate comprising i) 42-90 mol % of an unit of formula (1)

(1)

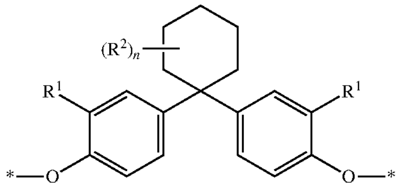

wherein

* indicates the position where formula (1) is connected to the polymer chain, $R^1$, each independently, is hydrogen or $C_1$-$C_4$ alkyl, $R^2$, each independently, is $C_1$-$C_4$ alkyl, n is 0, 1, 2 or 3, and ii) 10-58 mol % of an unit of formula (2):

(2)

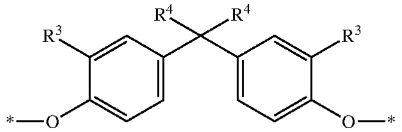

wherein

* indicates the position where formula (2) is connected to the polymer chain, $R^3$, each independently, is H, linear or branched $C_1$-$C_{10}$ alkyl, preferably, H, linear or branched $C_1$-$C_4$ alkyl, and $R^4$, each independently, is linear or branched $C_1$-$C_{10}$ alkyl, preferably linear or branched $C_1$-$C_4$ alkyl, wherein the mol % is calculated based on the total mole number of units of formula (1) and formula (2).

The units of formula (1) can be derived from a diphenol of formula (1'):

(1')

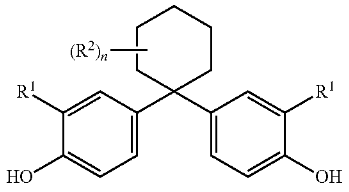

wherein $R^1$, each independently, represents hydrogen or $C_1$-$C_4$-alkyl, $R^2$, each independently, represents $C_1$-$C_4$-alkyl, n represents 0, 1, 2 or 3.

Preferably, the unit of formula (1) has the following formula (1a), (1a)

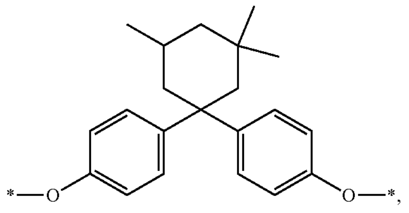

wherein * indicates the position where formula (1a) is connected to the polymer chain, i.e., the unit of formula (1) is derived from bis(4-hydroxyphenyl)-3,3,5-trimethylcyclohexane (BPTMC) having the formula (1'a):

(1'a)

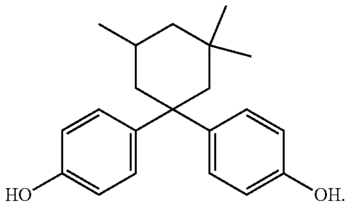

The units of formula (2) can be derived from a diphenol of formula (2'):

(2')

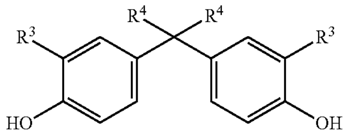

wherein $R^3$, each independently, represents H, linear or branched $C_1$-$C_{10}$ alkyl, $R^4$, each independently, represents linear or branched $C_1$-$C_{10}$ alkyl.

Preferably, the unit of formula (2) has the following formula (2a).

(2a)

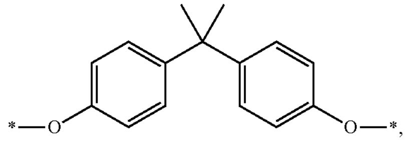

wherein * indicates the position where formula (2a) is connected to the polymer chain, i.e., the unit of formula (2) is derived from bisphenol A, i.e. the diphenol of formula (2'a).

(2'a)

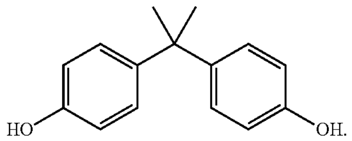

Preferably, the copolycarbonate comprises units derived from bis(4-hydroxyphenyl)-3,3,5-trimethylcyclohexane (BPTMC) and bisphenol A.

Preferably, the copolycarbonate does not comprise repeating units derived from a diphenol other than a diphenol of formula (1') and a diphenol of formula (2').

Preferably, the copolycarbonate does not comprise repeating units derived from a diphenol other than bis(4-hydroxyphenyl)-3,3,5-trimethylcyclohexane (BPTMC) and bisphenol A.

The diphenols of formula (1') and formula (2') are known and can be prepared by processes known from literatures (for example H. J. Buysch et al., Ullmann's Encyclopedia of Industrial Chemistry, VCH, New York 1991, 5th Ed., Vol. 19, p. 348).

The molar content of the units of the formula (1) in the copolycarbonate is 42-90 mol %, more preferably 44-86 mol %, still more preferably 44-80 mol %, based on the total mole number of units of formula (1) and formula (2).

The mole content of the units of the formula (2) in the copolycarbonate is 10-58 mol %, more preferably 14-56 mol %, still more preferably 20-56 mol %, based on the total mole number of units of formula (1) and formula (2).

The copolycarbonate used in the composition according to the present invention is commercially available or can be produced by a process known in the art.

For example, the copolycarbonate used in the composition according to the present invention can be produced by an interfacial process. In particular, the diphenols of the formula (1) and (2) and optional branching agents are dissolved in aqueous alkaline solution and reacted with a carbonate source, such as phosgene, optionally dissolved in a solvent, in a two-phase mixture comprising an aqueous alkaline solution, an organic solvent and a catalyst, preferably an amine compound. The reaction procedure can also be conducted in a multistep process.

Such processes for the preparation of copolycarbonate are known in principle as two-phase interfacial processes, for example from H. Schnell, Chemistry and Physics of Polycarbonates, Polymer Reviews, Vol. 9, Interscience Publishers, New York 1964, page 33 et seq., and on Polymer Reviews, Vol. 10, "Condensation Polymers by Interfacial and Solution Methods", Paul W. Morgan, Interscience Publishers, New York 1965, Chapter VIII, page 325, and the underlying conditions are therefore familiar to the person skilled in the art.

The concentration of the diphenols in the aqueous alkaline solution is from 2 wt. % to 25 wt. %, preferably from 2 wt. % to 20 wt. %, more preferably from 2 wt. % to 18 wt. % and even more preferably from 3 wt. % to 15 wt. %. The aqueous alkaline solution consists of water in which hydroxides of alkali metals or alkaline earth metals are dissolved. Sodium and potassium hydroxides are preferred.

The concentration of the amine compound is from 0.1 mol % to 10 mol %, preferably 0.2 mol % to 8 mol %, particularly preferably 0.3 mol % to 6 mol % and more particularly preferably 0.4 mol % to 5 mol %, relative to the mole amount of diphenol used.

The carbonate source is phosgene, diphosgene or triphosgene, preferably phosgene. Where phosgene is used, a solvent may optionally be dispensed with and the phosgene may be passed directly into the reaction mixture.

Tertiary amines, such as triethylamine or N-alkylpiperidines, may be used as a catalyst. Suitable catalysts are trialkylamines and 4-(dimethylamino)pyridine. Triethylamine, tripropylamine, triisopropylamine, tributylamine, trisobutylamine, N-methylpiperidine, N-ethylpiperidine and N-propylpiperidine are particularly suitable.

Halogenated hydrocarbons, such as methylene chloride, chlorobenzene, dichlorobenzene, trichlorobenzene or mixtures thereof, or aromatic hydrocarbons, such as, toluene or xylenes, are suitable as an organic solvent. The reaction temperature may be from −5° C. to 100° C., preferably from 0° C. to 80° C., particularly preferably from 10° C. to 70° C. and very particularly preferably from 10° C. to 60° C. The preparation of the copolycarbonates by the melt transesterification process, in which the diphenols are reacted with diaryl carbonates, generally diphenyl carbonate, in the presence of catalysts, such as alkali metal salts, ammonium or phosphonium compounds, in the melt, is also possible.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964), and DE-C 1031 512.

In the transesterification process the aromatic dihydroxy compounds already described in the case of the phase boundary process are transesterified with carbonic acid diesters with the aid of suitable catalysts and optionally further additives in the melt.

The reaction of the aromatic dihydroxy compound and of the carbonic acid diester to give the copolycarbonate can be carried out batchwise or preferably continuously, for example in stirred vessels, thin-film evaporators, falling-film evaporators, stirred vessel cascades, extruders, kneaders, simple disc reactors and high-viscosity disc reactors.

Preferably, the copolycarbonate is selected from block copolycarbonates and random copolycarbonates. More preferably, the copolycarbonate is selected from random copolycarbonates.

Preferably, the copolycarbonate has a weight average molecular weight (Mw) ranging from 16000 g/mol to 40000 g/mol, preferably from 17000 g/mol to 32000 g/mol, as determined by Gel Permeation Chromatography (GPC) in methylene chloride at 25° C. using a polycarbonate standard with an UV-IR detector.

As an example for commercial products of the copolycarbonate suitable for the composition according to the present invention, mention can be made of the products sold under the name APEC® by the company Covestro Polymer (China), which are polycarbonate copolymers made from the copolymerization of carbonyl chloride with bisphenol A (BPA) and 3,3,5-trimethyl-1,1-bis(4-hydroxyphenyl) cyclohexane (BPTMC).

Preferably, the copolycarbonate is present in an amount ranging from 60 wt. % to 95 wt. %, more preferably from 65 wt. % to 95 wt. %, even more preferably from 70 wt. % to 95 wt. %, relative to the total weight of the composition according to the present invention.

Component B

According to the first aspect, the polycarbonate composition according to the present invention comprises a homopolycarbonate comprising an unit of formula (2).

In the present application, homopolycarbonate refers to the polycarbonate comprising an unit of formula (2) as defined above.

The homopolycarbonate is derived from a diphenol of formula (2'):

(2')

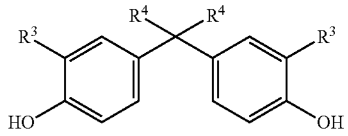

wherein $R^3$, each independently, represents H, linear or branched $C_1$-$C_{10}$ alkyl, preferably linear or branched $C_1$-$C_6$-alkyl, more preferably linear or branched $C_1$-$C_4$ alkyl, even more preferably H or methyl, and $R^4$, each independently, represents linear or branched $C_1$-$C_{10}$ alkyl, preferably linear or branched $C_1$-$C_6$ alkyl, more preferably linear or branched $C_1$-$C_4$-alkyl, even more preferably methyl.

Preferably, the homopolycarbonate is derived from the diphenol of formula (2'a), i.e. bisphenol A.

(2'a)

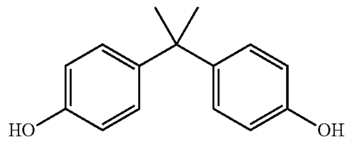

The homopolycarbonate used in the composition according to the present invention is commercially available or can be produced by a process known in the art.

For example, the homopolycarbonate can be produced by referring to the preparation process described with respect to component A.

Preferably, the homopolycarbonate has a weight average molecular weight (Mw) ranging from 24,000 g/mol to 28,000 g/mol, as determined by Gel Permeation Chromatography (GPC) in methylene chloride at 25° C. using a polycarbonate standard with an UV-IR detector.

As commercial products of homopolycarbonates suitable for use in the composition according to the present invention, mention can be made of Makrolon® 2400 and Makrolon® 2600 sold by the company Covestro polymer (China).

Preferably, the homopolycarbonate is present in an amount ranging from 5 wt. % to 40 wt. %, more preferably 5 wt. % to 35 wt. %, even more preferably 5 wt. % to 30 wt. %, relative to the total weight of the composition according to the present invention.

Preferably, the content by weight of the unit of formula (1a) in the polycarbonate composition is 42-66 wt. %, relative to the total weight of the composition according to the present invention.

Additives

In addition to component A and component B mentioned above, the polycarbonate compositions according to the present invention can optionally comprise one or more additives conventionally used in polycarbonate compositions. Such additives are, for example, fillers, carbon black, UV stabilizers, IR stabilizers, heat stabilizers, antistatic agents, pigments, colorants, lubricants, demoulding agents (e.g. pentaerythritol tetrastearate (PETS), glycerine monostearate(GMS)), antioxidants, flow improvers agents, flameproofing agents, etc.

Such additives are described, for example, in WO 99/55772, pages 15-25, and in "Plastics Additives", R. Gachter and H. MUller, Hanser Publishers 1983).

The person skilled in the art can select the type of the additives so as not to adversely affect the desired properties of the polycarbonate composition according to the present invention.

The total amount of the additives preferably is up to 4 wt. %, preferably from 0 to 3 wt. %, more preferably 0 to 2 wt. %, relative to the total weight of the polycarbonate composition.

Preferably, the composition according to the present invention comprises, relative to the total weight of the composition:

a) 60-95 wt. % of a copolycarbonate comprising i) 42-90 mol % of unit of formula (1a)

(1a)

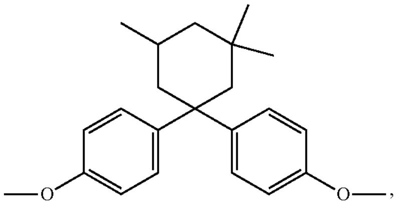

, and ii) 10-58 mol % of unit of formula (2a):

(2a)

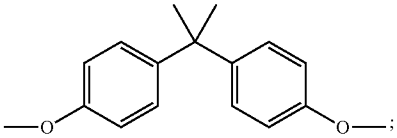

;

wherein the mol % is calculated based on the total mole number of units of formula (1a) and formula (2a), and b) from 10-40 wt. % of a homopolycarbonate comprising unit of formula (2a), wherein the weight-average molecular weight of the copolycarbonate is in the range of 17000 g/mol to 32000 g/mol, the weight-average molecular weight of the homopolycarbonate is in the range of 24000-28000 g/mol, the content by weight of the unit of formula (1a) in the polycarbonate composition is 42-66 wt. %, relative to the total weight of the composition, and the total amount of the homopolycarbonate and the copolycarbonate in the composition is 96-100 wt. %, relative to the total weight of the composition.

Preferably, the composition consists of i) a copolycarbonate comprising units derived from bis(4-hydroxyphenyl)-3,3,5-trimethylcyclohexane (BPTMC) and bisphenol A and ii) a homopolycarbonate comprising units derived from bisphenol A.

Preparation of the Polycarbonate Composition

The polycarbonate composition according to the present invention can be in the form of, for example, pellets.

The polycarbonate composition according to the present invention demonstrates a good processing behaviour and can be prepared by a variety of methods involving intimate admixing of the materials desired in the composition.

For example, the materials desired in the composition are first blended in a high speed mixer. Low shear processes, including but not limited to hand mixing, can also accomplish this blending. The blend is then fed into the throat of a twin-screw extruder via a hopper. Alternatively, at least one of the components can be incorporated into the composition by feeding it directly into the extruder at the throat and/or downstream through a side stuffer. Additives can also be compounded into a masterbatch with a desired polymeric resin and fed into the extruder. The extruder is generally operated at a temperature higher than that necessary to cause the composition to flow. The extrudate is immediately quenched in a water bath and pelletized. The pellets can be one-fourth inch long or less as described. Such pellets can be used for subsequent molding, shaping or forming.

Melt blending methods are preferred due to the availability of melt blending equipment in commercial polymer processing facilities.

Illustrative examples of equipment used in such melt processing methods include co-rotating and counter-rotating extruders, single screw extruders, co-kneaders, and various other types of extrusion equipment.

The temperature of the melt in the processing is preferably minimized in order to avoid excessive degradation of the polymers. It is often desirable to maintain the melt temperature between 230° C. and 350° C. in the molten resin composition, although higher temperatures can be used provided that the residence time of the resin in the processing equipment is kept short.

In some cases, the melting composition exits from a processing equipment such as an extruder through small exit holes in a die. The resulting strands of the molten resin are cooled by passing the strands through a water bath. The cooled strands can be chopped into small pellets for packaging and further handling.

Shaped Articles

The polycarbonate compositions according to the present invention can be used, for example for the production of various types of shaped articles.

In the second aspect, the present invention also provides a shaped article made from a polycarbonate composition according to the first aspect of the present invention.

As examples of such shaped articles mention can be made of, for example, films; profiles; housing parts, e.g. for domestic appliances or for office machines such as monitors, flat screens, notebooks, printers and copiers; sheets; tubes; electrical conduits; windows, doors and other profiles for the building sector (interior and exterior applications); electrical and electronic parts such as keypads, screen display covers, switches, plugs and sockets; lenses, and body parts or interior trim for commercial vehicles.

Preparation of Shaped Articles

The polycarbonate compositions according to the present invention can be processed into shaped articles by a variety of means such as injection moulding, extrusion moulding, blow moulding or thermoforming to form shaped articles.

In the third aspect, the present invention provides a process for preparing the shaped article made from a composition according to the first aspect of the present invention, comprising injection moulding, extrusion moulding, blow moulding or thermoforming the polycarbonate composition according to the present invention.

EXAMPLES

The present invention will be illustrated in detail below with reference to the examples below. The examples are only for the purpose of illustration, rather than limiting the scope of the present invention.

Materials Used

Component A

CoPC-1: commercially available from the company Covestro polymer (China), a copolycarbonate based on 70 mol % of 3,3,5-trimethyl-1,1-bis(4-hydroxyphenyl)cyclohexane (bisphenol TMC) units and 30 mol % of bisphenol A units, based on the total amount of bisphenol units, with a MVR of 7 $cm^3$/10 min, as measured at 330° C., 1.2 kg according to ISO 1133: 2011, and a weight average molecular weight of about 30000 g/mol, as determined by means of Gel Permeation Chromatography (GPC) in methylene chloride at 25° C. using a polycarbonate standard.

CoPC-2: commercially available from the company Covestro polymer (China), a copolycarbonate based on 44 mol % of 3,3,5-trimethyl-1,1-bis(4-hydroxyphenyl)cyclohexane (bisphenol TMC) units and 56 mol % of bisphenol A units, based on the total amount of bisphenol units, with a MVR of 16 $cm^3$/10 min, as measured at 330° C., 1.2 kg according to ISO 1133: 2011, and a weight average molecular weight of about 27000 g/mol, as determined by means of Gel Permeation Chromatography (GPC) in methylene chloride at 25° C. using a polycarbonate standard.

Component B

PC-1: commercially available from the company Covestro polymer (China), a linear polycarbonate based on bisphenol A having a weight average molecular weight (Mw) of about 20000 g/mol, as determined by means of Gel Permeation Chromatography (GPC) in methylene chloride at 25° C. using a polycarbonate standard.

PC-2: commercially available from the company Covestro polymer (China), a linear polycarbonate based on bisphenol A having a weight average molecular weight of about 24000 g/mol, as determined by means of Gel Permeation Chromatography (GPC) in methylene chloride at 25° C. using a polycarbonate standard.

PC-3: commercially available from the company Covestro polymer (China), a linear polycarbonate based on bisphenol A have a weight average molecular weight of about 26000 g/mol, as determined by means of Gel Permeation Chromatography (GPC) in methylene chloride at 25° C. using a polycarbonate standard.

PC-4: commercially available from the company Covestro polymer (China), a linear polycarbonate based on bisphenol A have a weight average molecular weight of about 28000 g/mol, as determined by means of Gel Permeation Chromatography (GPC) in methylene chloride at 25° ° C. using a polycarbonate standard.

Component C

ABS: commercially available under the trade name P60 from INEOS Styrolution GmbH, a core-shell impact modifier prepared by emulsion polymerization of 58 wt. %, based on the ABS polymer, of a mixture of 24 wt. % of acrylonitrile and 76 wt. % of styrene in the presence of 42 wt. %, based on the ABS polymer, of a linear polybutadiene rubber.

Test Methods

The physical properties of specimens in the examples were tested as follows.

Comparative Tracking Index

The comparative tracking index (CTI) was determined according to IEC60112:2011.

Transmittance

Transmittance for a visible light with a wavelength of 390-780 nm was measured on a molded sheet with a thickness of 3 mm on Haze-Guard dual from BYK-Gardner, according to ASTM D1003: (2013).

Vicat Softening Temperature

The Vicat softening temperature ($T_{Vicat}$) was determined on test specimens of dimension of 80 mm×10 mm×4 mm according to ISO 306: (2013) with a ram load of 50 N and a heating rate of 120° C./h with a Coesfeld Eco 2920 instrument from Coesfeld Materialtest.

Melt Volume Flow Rate (MVR)

The melt volume flow rate (MVR) was determined according to ISO 1133: 2011 at 330° C. and a loading of 1.2 kg with a Zwick 4106 instrument from Roell.

Invention Examples (IE) 1-8 and Comparative Examples (CE) 1-8

The materials listed in Table 1 were compounded on a twin-screw extruder (ZSK-26) (from Coperion, Werner and Pfleiderer) at a speed of rotation of 225 rpm, a throughput of 20 kg/h, and a machine temperature of 300° C.-330° ° C., and granulated.

The granules were processed into corresponding testing specimens on an injection moulding machine (from Arburg) with a melting temperature of 330° C. and a mold temperature of 60° C.

The physical properties (including comparative tracking index (CTI), melt volume flow rate (MVR), transmittance, and Vicat softening temperature ($T_{Vicat}$)) of the compositions obtained were tested and the results were summarized in Table 1.

TABLE 1¶

| | Examples¤ | | | | | | | | |
|---|---|---|---|---|---|---|---|---|---|
| | CE1¤ | CE2¤ | CE3¤ | CE4¤ | IE1¶¤ | IE2¤ | IE3¤ | CE5¤ | IE4¤ |
| ¤ | Parts by weight (pbw)¤ | | | | | | | | |
| CoPC-1 ¤ | 80¤ | 68¤ | 45¤ | 20¤ | 95¤ | 80¤ | 68¤ | 40¤ | 80¤ |
| PC-1¶ (Mw = 20000 g/mol)¤ | 20¤ | 32¤ | 55¤ | 80¤ | —¤ | —¤ | —¤ | —¤ | —¤ |
| PC-2¶ (Mw = 24000 g/mol)¤ | —¤ | —¤ | —¤ | —¤ | 5¤ | 20¤ | 32¤ | 60¤ | —¤ |
| PC-3¶ (Mw = 26000 g/mol)¤ | —¤ | —¤ | —¤ | —¤ | —¤ | —¤ | —¤ | —¤ | 20¤ |
| PC-4¶ (Mw = 28000 g/mol)¤ | —¤ | —¤ | —¤ | —¤ | —¤ | —¤ | —¤ | —¤ | —¤ |
| BPTMC unit content (wt. %)[1)]¤ | 55¤ | 47¤ | 31¤ | 14¤ | 56¤ | 55¤ | 47¤ | 28¤ | 55¤ |
| CTI(V)¤ | 250¤ | 250¤ | 200¤ | 200¤ | 600¤ | 600¤ | 600¤ | 250¤ | 600¤ |
| MVR($cm^3$/10 min)¤ | 15.3¤ | 25.4¤ | 51¤ | 150¤ | 9.6¤ | 14.2¤ | 18¤ | 30.8¤ | 12¤ |
| Transmittance (%)¤ | 86.5¤ | 86.2¤ | 87.1¤ | 87.7¤ | 88.6¤ | 88.3¤ | 88.1¤ | 87.9¤ | 87.8¤ |
| $T_{Vicat}$(° C.)¤ | 196¤ | 187¤ | 172¤ | 158¤ | 205¤ | 196¤ | 189¤ | 172¤ | 196¤ |

| | Examples¤ | | | | | | | |
|---|---|---|---|---|---|---|---|---|
| | IE5¤ | CE6¤ | IE6¤ | IE7¤ | IE8¤ | CE7¤ | CE8¤ | ¤ |
| ¤ | Parts by weight (pbw)¤ | | | | | | | ¤ |
| CoPC-1¤ | 60¤ | 40¤ | 95¤ | 80¤ | 60¤ | 50¤ | 100¤ | ¤ |
| PC-1¶ (Mw = 20000 g/mol)¤ | —¤ | —¤ | —¤ | —¤ | —¤ | —¤ | —¤ | ¤ |
| PC-2¶ (Mw = 24000 g/mol)¤ | —¤ | —¤ | —¤ | —¤ | —¤ | —¤ | —¤ | ¤ |
| PC-3¶ (Mw = 26000 g/mol)¤ | 40¤ | 60¤ | —¤ | —¤ | —¤ | —¤ | —¤ | ¤ |
| PC-4¶ (Mw = 28000 g/mol)¤ | —¤ | —¤ | 5¤ | 20¤ | 40¤ | 50¤ | —¤ | ¤ |
| BPTMC unit content (wt. %)[1)]¤ | 42¤ | 28¤ | 66¤ | 55¤ | 42¤ | 35¤ | 69¤ | ¤ |
| CTI(V)¤ | 600¤ | 300¤ | 500¤ | 600¤ | 600¤ | 225¤ | 600¤ | ¤ |
| MVR($cm^3$/10 min)¤ | 19¤ | 25.8¤ | 9.3¤ | 11.6¤ | 17¤ | 20¤ | 6¤ | ¤ |
| Transmittance (%)¤ | 88.5¤ | 88.46¤ | 88.5¤ | 87.8¤ | 88.2¤ | 80¤ | 88¤ | ¤ |
| $T_{Vicat}$(° C.)¤ | 184¤ | 172¤ | 206¤ | 195¤ | 182¤ | 171¤ | 203¤ | ¤ |

[1)]BPTMC content means the BPTMC unit content by weight in the polycarbonate composition.¶

As used herein, the content by weight of BPTMC unit ($C_{BPTMC/C/W}$) in the polycarbonate composition is calculated as follows:

$$C_{BPTMC/C/W} = \frac{C_{BPTMC/CO/M} \times M_{wBPTMC}}{(C_{BPTMC/CO/M} \times M_{wBPTMC'} + C_{BPA/CO/M} \times M_{wBPA})} \times C_{co/c/w}$$

Wherein $C_{BPTMC/C/W}$ stands for the content by weight of BPTMC unit in the polycarbonate composition;

$C_{BPTMC/CO/M}$ stands for the content by mole of BPTMC unit in the copolycarbonate;

$M_{wBPTMC}$ stands for the molecular weight of BPTMC unit, which is expressed in grams per mole;

$M_{wBPTMC'}$ stands for the total molecular weight of BPTMC unit and —C═O—, which is expressed in grams per mole;

$C_{BPA/CO/M}$ stands for the content by mole of BPA unit in the copolycarbonate;

$M_{wBPA}$ stands for the molecular weight of BPA unit, which is expressed in grams per mole; and $C_{CO/C/W}$ stands for the content by weight of the copolycarbonate in the polycarbonate composition.

Taking invention example 1 as an example, the molar content of BPTMC unit is 70 mol % and the molar content of BPA unit is 30 mol % in CoPC-1, the molecular weight of BPTMC unit is 308 g/mol, the total molecular weight of BPTMC unit and —C═O— is 336 g/mol, the molecular weight of BPA unit (including —C═O—) is 254 g/mol, CoPC-1 is present in an amount of 95 wt. % in the polycarbonate composition, thus the content by weight of BPTMC unit in invention example 1 is:

$$\frac{70 \text{ mol } \% \times 308 \text{ g/mol}}{(70 \text{ mol } \% \times 336 \text{ g/mol} + 30 \text{ mol } \% \times 254 \text{ g/mol})} \times 95 \text{ wt. } \% = 66 \text{ wt. } \%$$

In comparative examples 1-7 and invention examples 1-8, copolycarbonate 1 (CoPC-1) containing 70 mol % of BPTMC unit were blended with BPA based polycarbonate at different weight ratios.

It can be seen from Table 1 that compositions comprising CoPC-1 and a homopolycarbonate (IE1-IE8) have a CTI no less than 600V when the weight ratio of CoPC-1 to the homopolycarbonate in each composition is no less than 60:40, the weight-average molecular weight of the homopolycarbonate is in a range of 24000-28000 g/mol, and the BPTMC content in each composition is within 42-80 wt. %.

It can also be seen from Table 1 that compositions comprising CoPC-1 and a homopolycarbonate (CE1-CE7) have a CTI no more than 250V when the weight ratio of CoPC-1 to the homopolycarbonate in the composition is below 60:40 or when the weight-average molecular weight of the homopolycarbonate is lower than 24000 g/mol.

As shown in comparative example 8, pure CoPC-1 resin has a CTI value of 600V, it has a very poor flow behaviour and therefore poor processability.

In addition, all molded parts made from the compositions of invention examples 1-8 (IE1-IE8) demonstrate a high transmittance (>86%) at a thickness of 3 mm and a high Vicat temperature (>180° C.).

Furthermore, all compositions of invention examples 1-8 (IE1-IE8) show better melt flow behavior (MVR) as compared to CoPC-1 resin of comparative example 8 (CE8).

Invention Examples (IE) 9-11 and Comparative Examples (CE) 9-14

Similarly, the materials listed in Table 2 were compounded, the physical properties of the compositions obtained were tested and the results were summarized in Table 2.

TABLE 2

| | CE9 | CE10 | CE11 | IE9 | CE12 | CE13 | IE10 | IE11 | CE14 |
|---|---|---|---|---|---|---|---|---|---|
| CoPC-1 | — | — | — | — | — | — | — | — | — |
| CoPC-2 | 100 | 70 | 87 | 90 | 80 | 87 | 90 | 90 | 80 |
| PC-1 (Mw = 20000 g/mol) | 1 | 30 | 13 | — | — | — | — | — | — |
| PC-2 (Mw = 24000 g/mol) | — | — | — | 10 | 20 | 13 | — | — | — |
| PC-3 (Mw = 26000 g/mol) | — | — | — | — | — | — | 10 | — | — |
| PC-4 (Mw = 28000 g/mol) | — | — | — | — | — | — | — | 10 | 20 |
| BPTMC unit content (wt. %)[1)] | 47 | 33 | 41 | 42 | 37 | 41 | 42 | 42 | 37 |
| CTI(V) | 600 | 225 | 300 | 600 | 300 | 325 | 600 | 600 | 325 |
| MVR($cm^3$/10 min) | 12 | 35 | 20 | 19 | 22.6 | 20 | 19.3 | 18.7 | 20.5 |
| Transmittance (%) | 88 | 89.57 | 86.70 | 87.50 | 89.52 | 89.51 | 88.53 | 89.04 | 89.22 |
| $T_{Vicat}$(° C.) | 183 | 172 | 175 | 177 | 177 | 179 | 179 | 180 | 176 |

[1)]BPTMC content means the BPTMC unit content by weight in the polycarbonate composition.

In comparative examples 10-14 and invention examples 9-11, copolycarbonate 2 (CoPC-2) containing 47 mol % of BPTMC unit were blended with a BPA-based homopolycarbonate at different weight ratios.

It can be seen from Table 2 that compositions comprising CoPC-2 and a homopolycarbonate in invention examples 9-11 (IE9-IE11) have a CTI no less than 600V when the weight ratio of CoPC-2 to the homopolycarbonate in the composition is no less than than 60:40, the weight-average molecular weight of the homopolycarbonate is in a range of 24000-28000 g/mol, and the BPTMC content in each composition is within 42-80 wt. %.

It also can be seen from Table 2 that compositions comprising CoPC-2 and a homopolycarbonate in comparative examples 10-14 (CE10-CE14) have a CTI in a range of 225-325V when the weight-average molecular weight of the homopolycarbonate is lower than 24000 g/mol or when the BPTMC content in each composition is lower than 42 wt. %.

In addition, all molded parts made from the compositions of invention examples 1-8 (IE1-IE8) demonstrate a high transmittance (>86%) at a thickness of 3 mm and a high Vicat temperature (>180° C.).

Furthermore, all compositions of invention examples 1-8 (IE1-IE8) show better melt flow behavior (MVR) as compared to CoPC-1 resin.

As shown in comparative example 9, pure CoPC-2 has a CTI value of 600V, it has a very poor flow behaviour and therefore poor processability.

The invention claimed is:

1. A polycarbonate composition comprising, relative to a total weight of the composition:

a) 60-95 wt. % of a copolycarbonate comprising i) 42-90 mol % of a unit of formula (1)

(1)

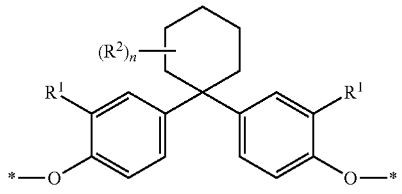

wherein

* indicates the position where formula (1) is connected to a polymer chain, $R^1$, each independently, is hydrogen or $C_1$-$C_4$ alkyl, $R^2$, each independently, is $C_1$-$C_4$ alkyl, n is 0, 1, 2 or 3, and ii) 10-58 mol % of a unit of formula (2):

(2)

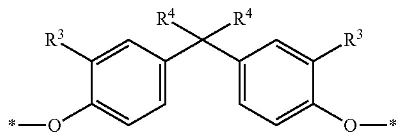

wherein

* indicates the position where formula (2) is connected to the polymer chain, $R^3$, each independently, is H, linear or branched $C_1$-$C_{10}$ alkyl, and $R^4$, each independently, is linear or branched $C_1$-$C_{10}$ alkyl, wherein the mol % is calculated based on a total mole number of units of formula (1) and formula (2), and b) 5-40 wt. % of a homopolycarbonate comprising a unit of formula (2) as defined above, wherein a weight-average molecular weight of the homopolycarbonate is in a range of 24000-28000 g/mol, wherein a content by weight of the unit of formula (1) in the polycarbonate composition is 42-80 wt. %, relative to the total weight of the composition, and wherein a total amount of the homopolycarbonate and the copolycarbonate in the polycarbonate composition is 96-100 wt. %, relative to the total weight of the composition.

2. The composition according to claim 1, wherein the copolycarbonate does not comprise units derived from a diphenol other than a diphenol of formula (1') and a diphenol of formula (2'):

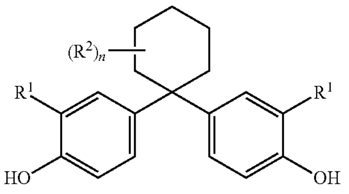

(1')

wherein $R^1$, each independently, represents hydrogen or $C_1$-$C_4$-alkyl, $R^2$, each independently, represents $C_1$-$C_4$-alkyl, n represents 0, 1, 2 or 3;

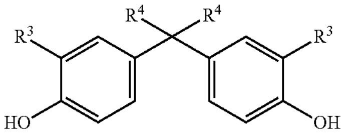

(2')

wherein $R^3$, each independently, represents H, linear or branched $C_1$-$C_{10}$ alkyl, $R^4$, each independently, represents linear or branched $C_1$-$C_{10}$ alkyl.

3. The composition according to claim 2, wherein the copolycarbonate does not comprise units derived from a diphenol other than bis(4-hydroxyphenyl)-3,3,5-trimethyl-cyclohexane (BPTMC) and bisphenol A.

4. The composition according to claim 1, wherein the molar content of the units of the formula (1) in the copolycarbonate is 44-86 mol %, based on the total mole number of units of formula (1) and formula (2).

5. The composition according to claim 1, wherein the copolycarbonate is selected from block copolycarbonates and random copolycarbonates.

6. The composition according to claim 1, wherein the copolycarbonate has a weight-average molecular weight (Mw) ranging from 16000 g/mol to 40000 g/mol, as determined by Gel Permeation Chromatography (GPC) in methylene chloride at 25° C. using a polycarbonate standard.

7. The composition according to claim 6, wherein the copolycarbonate is present in an amount ranging from 65 wt. % to 95 wt. %, relative to the total weight of the composition.

8. The composition according to claim 1, wherein the homopolycarbonate is derived from bisphenol A.

9. The composition according to claim 1, wherein the homopolycarbonate is present in an amount ranging from 5 wt. % to 35 wt. %, relative to the total weight of the composition.

10. The composition according to claim 1, further comprising one or more additives selected from fillers, carbon black, UV stabilizers, IR stabilizers, heat stabilizers, antistatic agents, pigments, colorants, lubricants, demoulding agents, antioxidants, flow improvers agents, and flameproofing agents.

11. The composition according to claim 10, wherein the demoulding agents are selected from pentaerythritol tetrastearate (PETS) and glycerine monostearate (GMS).

12. The composition according to claim 1, wherein the composition consists of i) a copolycarbonate comprising units derived from bis(4-hydroxyphenyl)-3,3,5-trimethylcyclohexane (BPTMC) and bisphenol A and ii) a homopolycarbonate comprising units derived from bisphenol A.

13. A shaped article made from the composition according to claim 1.

14. A process for preparing a shaped article, comprising injection moulding, extrusion moulding, blow moulding or thermoforming the polycarbonate composition according to claim 1.

15. The composition according to claim 1, wherein the molar content of the units of the formula (1) in the copolycarbonate is 40-80 mol %, based on the total mole number of units of formula (1) and formula (2).

16. The composition according to claim 1, having:

a comparative tracking index (CTI) of no less than 600V, as determined according to IEC60112:2011;

a transmittance of above 86% for a visible light with a wavelength of 390 nm-780 nm, as determined according to ASTM D1003:2013, on a sheet prepared therefrom with a thickness of 3 millimeters;

a melt volume flow rate (MVR) of above 9 $cm^3$/10 min, as determined at 330° C., 1.2 kg according to ISO 1133:2011; and a Vicat softening temperature of above 175° C., as determined according to 25 ISO 306:2013.

* * * * *